Nov. 27, 1951  C. BACHRACH  2,576,435
NOZZLE SUPPORT
Filed May 1, 1948

INVENTOR.
Charles Bachrach
BY Rudolph L. Lowell
Attorney

Patented Nov. 27, 1951

2,576,435

UNITED STATES PATENT OFFICE 2,576,435

NOZZLE SUPPORT

Charles Bachrach, Des Moines, Iowa, assignor to
The Delman Corporation, Des Moines, Iowa, a
corporation of Iowa Application April 1, 1948, Serial No. 18,413

1 Claim. (Cl. 20—40.5)

This invention relates generally to vehicle windshield washing systems and in particular to a nozzle structure for such systems.

Nozzle structures for windshield washers now in common use are generally mounted on the engine cowl at a position forwardly from the lower edge of the windshield. Where the top side of the engine cowl rear end extends in a substantially horizontal plane into the lower front side of the windshield, the nozzles are capable of being arranged at positions relatively close or near to the lower side of the windshield. However, some automobiles and many trucks have the rear ends of their cowls curved downwardly and forwardly from the lower front side of the windshields. In these cases it is not feasible to locate the nozzles on such curved cowl portions and to arrange the nozzles forwardly of the curved cowl portions is objectionable since the nozzles would be positioned substantially large distances both ahead of the windshield and below the level of the lower side of the windshield.

It is an object of this invention, therefore, to provide an improved nozzle structure for a vehicle windshield washer.

A further object of this invention is to provide a nozzle structure for a vehicle windshield washer which is capable of being mounted directly on the windshield frame.

Still another object of this invention is to provide a nozzle structure for a vehicle windshield washer which is adapted to be mounted adjacent to the bottom or lower front side of the windshield regardless of the contour of the engine cowl forwardly of the windshield.

Yet a further object of this invention is to provide a nozzle structure for a vehicle windshield washer which is adapted to be easily installed on substantially all models of automobiles and trucks, having various cowl designs and equipped with either one piece or two piece windshields, and efficient in operation to direct a liquid jet on to the windshield into the path of movement of the wipers associated therewith.

A feature of this invention is found in the provision of a nozzle structure for a vehicle windshield washer in which a body member is formed with a fluid passage having an inlet and an outlet adapted to direct a liquid jet on to the windshield. A resilient mounting member, carried on the rear end of the body member and of a construction adapted to lay over the usual molding strip at the front lower edge of the windshield, is integrally formed with a hook member capable of being inserted between the windshield and the molding strip. The complete nozzle structure is thus supported or hung from the molding strip. A substantially rigid fluid supply line connected between the fluid inlet on the body member and extended through the engine cowl of the vehicle, places the mounting member under tension to hold the nozzle structure in a fixed position on the molding strip. Fluid under pressure is supplied to the supply line from any suitable source. A pair of nozzle body members with single fluid outlets may be suitably arranged for use on one or two piece windshields, or a single centrally arranged nozzle member with a pair of oppositely arranged fluid outlets may be employed.

Further objects, features and advantages of this invention will appear from the following description when taken in connection with the accompanying drawings, in which.

Figure 1:
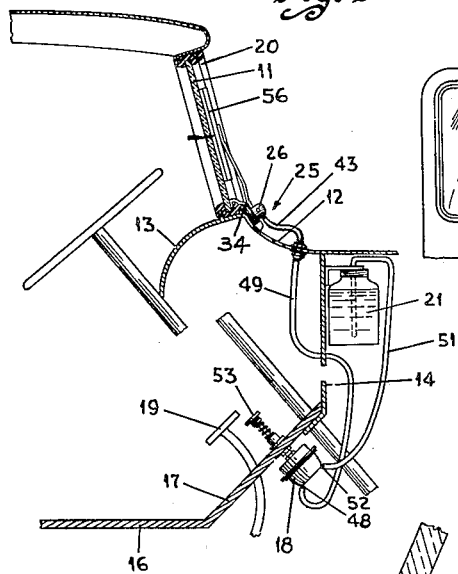
Fig. 1 is a fragmentary foreshortened longitudinal sectional view of a vehicle showing a windshield washer, embodying the nozzle structure of this invention, assembled thereon.
Figure 2:
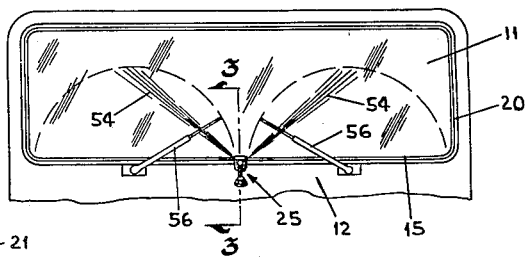
Fig. 2 is a fragmentary front view of a vehicle windshield showing the position of the nozzle structure thereon.

With reference to the drawings, there is illustrated in Figs. 1 and 2 a windshield clearing system as applied to an automobile having a single piece windshield 11, an engine cowl 12 curved downwardly and forwardly from the lower front edge 15 of the windshield, and an instrument panel or dashboard 13 located rearwardly of the windshield. The automobile is further equipped with a usual fire wall 14 and a floor board 16 having an upwardly and forwardly inclined portion 17 which joins with the lower end of the fire wall 14. Extended completely about the periphery of the windshield 11 is a usual molding or sealing strip 20.

The windshield washer includes a pump unit 18 supported from the floor board portion 17 at a position adjacent to the vehicle clutch pedal 19, and a liquid glass container or reservoir 21 carried on the front side of the fire wall 14.

Figure 5:
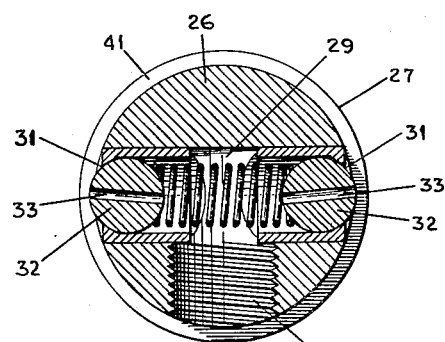
Fig. 5 is an enlarged sectional view as seen on the line 5—5 in Fig. 4.

The nozzle structure of this invention, indicated generally as 25, includes a body member 26 of a generally cylindrical shape and formed at its rear end with an annular laterally extended flange or shoulder 27. Adjacent its front end 30, the body member 26 is formed with an upright internally threaded passage or fluid inlet 28 (Figs. 3, 4 and 5) which is in fluid communication with a transverse passage 29 having outlets 31 arranged at opposite sides of the body member 26. Adjustably carried within the outlets 31 are spring pressed ball members 32, each of which is formed with a liquid passage 33 extended diammetrically therethrough. By merely inserting the end of a pin or the like within the passages 33, the balls 32 are adjustable for directing a spray of liquid against the opposite side portions of the windshield 11.

Figure 3:
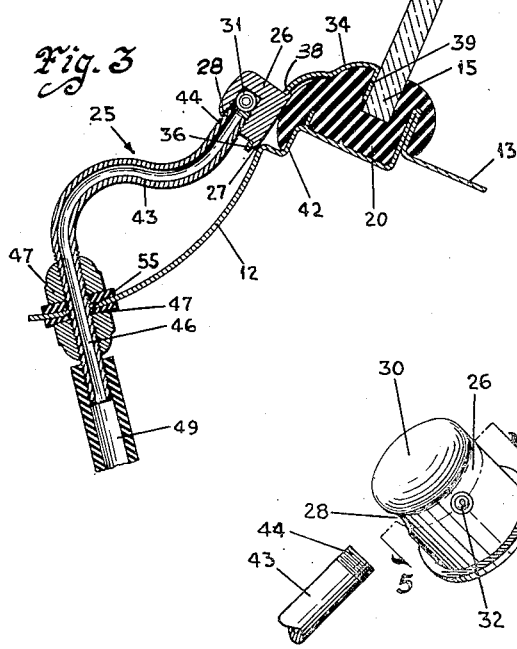
Fig. 3 is an enlarged detail sectional view of the nozzle structure taken along the line 3—3 in Fig. 2.
Figure 4:
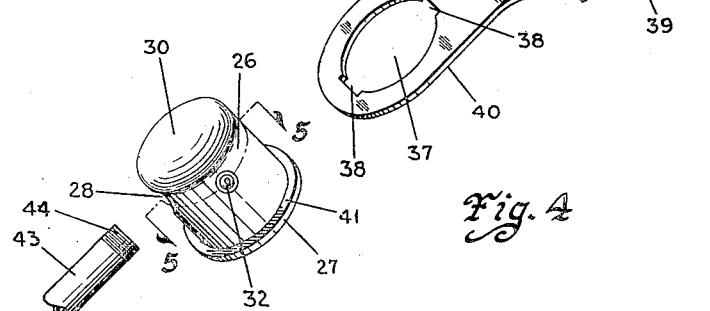
Fig. 4 is an exploded perspective view of the nozzle structure with parts broken away to more clearly show its construction.

The body member 26 is mounted on that portion of the molding strip 20 which extends along the lower front edge of the windshield 11 at a position intermediate the ends of the windshield by the provision of means including a mounting or clip member 34 (Figs. 3 and 4). The mounting member 34 is of a one-piece construction, formed from a single piece of material having resilient characteristics, and of a generally convex shape in longitudinal cross section, to provide for its being positioned in an upright direction across the mounting strip 20.

The lower end 36 of the mounting member 34, is provided with an opening 37 adapted to receive the body member 26 therethrough. The opening 37 is formed at oppositely arranged positions with recesses or notches 38 of a size adapted to accommodate the outer ends of the ball members 32. The upper end of the clip member 34 is formed with a V-shape prong or hook member 39 which is extended laterally in a downward direction.

In the assembly of the nozzle structure, the nozzle member front end 30, with the ball members 32 in alignment with the notches 38, is positioned within the opening 37 and then moved through the opening until the front side 40 of the mounting member 34, over those portions about the opening 37, is in abutting engagement with the rear side 41 of the annular shoulder 27. The body member 26 is then turned or rotated through an angle of about ninety degrees to move the ball member 32 out of alignment with the notches 38, and to position the inlet passage 28 at the bottom side of the member 26, as clearly appears in Fig. 3.

A substantially rigid fluid supply line or tube 43, of a somewhat serpentine shape, has one end 44 threadably connected within the fluid inlet 28. With the tube 43 thus assembled with the nozzle member 26, the prong or hook member 39 is inserted between the molding strip 20 and the front side of the lower edge 15 of the windshield 11 at a position intermediate the ends of the windshield.

It is seen, therefore, that the nozzle member 26 is supported or hung from the molding strip 20 such that the member 26 is adjacent to the rear end 42 of the engine cowl 12, and the outlets 31 are arranged at opposite sides of the nozzle member 26. The end 46 of the supply tube 43 is then extended through an opening 55 in the engine cowl 12 at a position forwardly of the nozzle member 26, and held in a fixed relation with the engine cowl 12 by means of usual nut and washer assemblies 47, positioned about the tube 43 to opposite sides of the cowl 12.

It is contemplated that the tube 43 and mounting member 34 be relatively constructed so that in their assembled positions the mounting member 34 is placed under tension, namely, its lower end is flexed upwardly relative to its upper end, to maintain the mounting member 34 in a fixed position relative to the molding strip 20. Further it will be noted that the resilience of the mounting member 34 facilitates the insertion of the tube end 46 in the cowl opening 55.

The tube end 46 is connected with the outlet 48 of the pump 18 through a rubber connection 49. A second rubber tube or connection 51 is connected between the pump inlet 52 and the liquid reservoir 21. The pump outlet 48 and pump inlet 52 are provided with one-way reversely actuated valves (not shown) so that on actuation of a foot-operated plunger 53 for the pump 18, fluid under pressure is discharged from the ball member passages 33 when the plunger is depressed, and fluid is drawn into the pump 18 from the reservoir 21, when the plunger 53 is released. In other words, fluid is ejected from the nozzle member 26 each time the plunger 53 is depressed. As best appears in Fig. 2, the ball members 32 are adjusted to direct a jet or spray of liquid 54 upwardly and on to the windshield 11 and into the paths of movement of the usual double windshield wipers 56 associated therewith.

From a consideration of the above description it is seen that the invention provides a nozzle structure which is of a simple and compact construction and adapted to be supported directly from the usual molding strip at the lower edge of the windshield. As a result, the nozzle member 26 is closely adjacent to the windshield to facilitate the application of the liquid sprays 54 in an upward direction on to the windshield, regardless of the contour of the rear end of the engine cowl 12. In this assembly it will be noted that no machine work is required on the windshield 11 and that only a single opening 55 is required in the cowl 12 for reception of the supply tube 43.

In one embodiment of the invention the mounting member 34 has an overall length of one and one-quarter inches, and the nozzle member 26 is about three-eighths of an inch in diameter and about one-half an inch in length. In this embodiment the tube 43 is one-eighth of an inch in diameter and of an overall length to the outside of the cowl 12, of about two and one-quarter inches. It is seen, therefore, that the nozzle structure in no way detracts from the overall appearance of the vehicle, and that a minimum of defacement takes place in the assembly of the structure on the vehicle.

Although the invention has been described and illustrated with respect to a preferred embodiment thereof, it is to be understood that it is not to be so limited since changes and modifications can be made therein which are within the full intended scope of this invention as defined by the appended claim.

I claim:

The means for supporting a nozzle structure of a cylindrical shape and formed at the rear end thereof with an annular flange, on a vehicle having a windshield, a molding strip along the front side of the lower edge of the windshield and an engine cowl terminating at said molding strip, said supporting means comprising a resilient mounting member formed at one end with an opening to receive said nozzle structure therein such that the front side of said flange is in abutting engagement with the rear side of said mounting member about said opening, a lateral projection at the other end of said mounting member inserted between said windshield and molding strip, a substantially rigid fluid supply line fluid connected to said nozzle structure adjacent the front end thereof and projected forwardly and downwardly from said nozzle structure for extension through said cowl, and means for securing said fluid supply line to said cowl such that a forwardly directed pressure is applied on said lateral projection through said nozzle structure.

CHARLES BACHRACH.

REFERENCES CITED

The following references are of record in the file of this patent:

UNITED STATES PATENTS

| Number | Name | Date |
|---|---|---|
| 553,940 | Rollandet et al. | Feb. 4, 1896 |
| 1,287,846 | Blake | Dec. 17, 1918 |
| 1,809,550 | Farrar | June 9, 1931 |
| 1,922,133 | Houglum | Aug. 15, 1933 |
| 2,105,676 | Stow | Jan. 18, 1938 |
| 2,289,650 | Horton | July 14, 1942 |
| 2,457,972 | Bailey | Jan. 4, 1949 |